United States Patent [19]
Lajovic

[11] 3,906,070
[45] Sept. 16, 1975

[54] METHOD OF PROTECTIVELY COVERING METAL THREADS

[75] Inventor: Dusan S. Lajovic, Smithfield, Australia

[73] Assignee: Colgate-Palmolive Company, New York, N.Y.

[22] Filed: Oct. 6, 1972

[21] Appl. No.: 295,538

Related U.S. Application Data

[62] Division of Ser. No. 75,840, Sept. 28, 1970, abandoned.

[52] U.S. Cl. .............. 264/159; 264/230; 264/242; 264/249
[51] Int. Cl.² B28B 11/08; B29C 27/00; B29D 7/16
[58] Field of Search .......... 264/150, 159, 242, 249, 264/DIG. 41, 71, 230, 239, 294, 263, 310, 342 R, 232, 342, 138, 250, 274, 293; 156/86, 481; 53/14, 16, 17, 27, 30, 40, 42, 329, 30 S, 292; 215/38 A, 38 B, 40, 246; 222/92, 106; 220/DIG. 7, 45; 29/447; 206/277

[56] References Cited
UNITED STATES PATENTS

| | | | |
|---|---|---|---|
| 825,116 | 7/1906 | Engels | 264/230 X |
| 937,401 | 10/1909 | Wilzin | 53/42 |
| 2,027,962 | 1/1936 | Currie | 215/38 A |
| 2,029,131 | 1/1936 | Shoemaker | 156/86 X |
| 2,223,017 | 11/1940 | Abrams et al. | 264/230 X |
| 2,794,574 | 6/1957 | McGeorge et al. | 222/92 |
| 2,885,105 | 5/1959 | Heyl et al. | 264/230 |
| 2,937,481 | 5/1960 | Palmer | 53/17 X |
| 3,039,247 | 6/1962 | Thomas et al. | 53/42 |
| 3,187,478 | 6/1965 | Kirkpatrick | 53/30 |
| 3,523,052 | 8/1970 | Bolen | 156/86 X |
| 3,587,898 | 6/1971 | Northrup | 215/40 |
| 3,664,535 | 5/1972 | Mette | 215/40 |

FOREIGN PATENTS OR APPLICATIONS

| | | | |
|---|---|---|---|
| 678,389 | 1/1964 | Canada | 215/246 |

*Primary Examiner*—Robert F. White
*Assistant Examiner*—Willard E. Hoag
*Attorney, Agent, or Firm*—Strauch, Neale, Nies & Kurz

[57] ABSTRACT

A plastic insert is formed around the externally threaded dispensing neck of a metal toothpaste or like tube by positioning a collar section of heat shrinkable plastic material around the neck in the presence of heat sufficient to shrink the material upon and within the threads, and the internally threaded end closure for the tube is rotatably mounted on the neck whereby the collar is tightly secured on the neck and conformed to the matching threaded contour of the neck and closure.

17 Claims, 5 Drawing Figures

PATENTED SEP 16 1975 3,906,070

METHOD OF PROTECTIVELY COVERING METAL THREADS

This is a division of application Ser. No. 75,840, filed Sept. 28, 1970 (now abandoned) which was refiled Feb. 5, 1973 as Ser. No. 329,399.

This invention relates to methods of inserting plastic or other inserts in screw threads, particularly at the externally screw threaded dispensing necks of toothpaste and like tubes, and the resultant articles.

In the manufacture of flexible tubes such as aluminum or aluminum alloy toothpaste tubes, it is customary to form upon one end a rigid reduced diameter dispensing neck having an external screw thread adapted to removably mount an internally threaded closure cap. Where the contents of the tube are substances containing abrasive particles such as toothpaste, any paste at or near the exit orifice of the neck tends to become discoloured as it spreads onto and abrades the exposed aluminum surface of said neck, especially when said cap is removed and reinstalled a number of times during use of the tube contents.

In attempts to overcome the above-mentioned problem, it has been proposed to install upon a knurled or other roughened outer surface of the metal neck an enveloping plastic sleeve which is moulded in situ and provided with an inwardly turned lip at the outer extremity thereof so as to cover the erstwhile outer lip of the metal neck. Upon the outer surface of that plastic sleeve a suitable screw thread is formed during the moulding operation, and an internally threaded cap (usually larger than standard) may then be installed thereon.

A disadvantage of this proposed arrangement is that the exit orifice of the plastic sleeve is usually reduced in area and thereby restricts the normal passage of paste. Furthermore, the sleeve moulding process is expensive, and the external thread formed on the plastic sleeve is insufficiently supported, and hence the coacting cap tends to strip off.

It is a major object of the present invention to overcome the foregoing disadvantages and others by providing a novel method of protectively covering screw threads of a metal article, such as the screw threaded neck of a toothpaste tube or the like, with a fixed thin covering of a heat shrinkable plastic such as polyvinyl chloride, and the novel article produced by the method. Pursuant to this object the method is preferably accomplished at the point in manufacture of the tube after it has been coated and printed on its external surface and has emerged hot from a coating and ink drying oven, the retained heat being sufficient to shrink the plastic covering upon and into the threads. It is however within the scope of the invention to apply added or even all heat necessary for the shrinking action from an external source.

It is a further object of the invention, in accordance with a preferred embodiment, to provide a novel method of installing a covering insert in an external screw thread formed in the metal neck of a toothpaste tube or the like, which method comprises the steps of feeding onto said neck a collar of flexible sheet plastic material of sufficient length to cover said thread and also project outwardly somewhat beyond the free end of said neck, the tube neck being sufficiently hot or heated to cause shrinking of the collar about the threads, and then rotatably fitting an internally threaded device such as the plastic closure cap for the tube over said tube neck, thereby tightly forming the plastic collar into full conformity with the neck threads and displacing the outer edge of the plastic collar over and sometimes within the lip of said neck. The collar may be severed from a length of plastic tubing. Upon allowing the confined warm plastic material to cool, the formed insert then assumes sufficient rigidity to protect the metal surface and is also adequately supported and stabilized by the metal structure lying beneath it.

Apparatus constructed in accordance with the invention may be formed without the use of expensive moulding equipment such as dies. In addition, the inserts may be formed from relatively small quantities of plastic sheet material in comparison with the amounts necessary to mould solid rigid sleeves. Furthermore, the plastic caps accurately fit the necks since they aid in forming the thread covering.

PREFERRED EMBODIMENT

Figure 1:
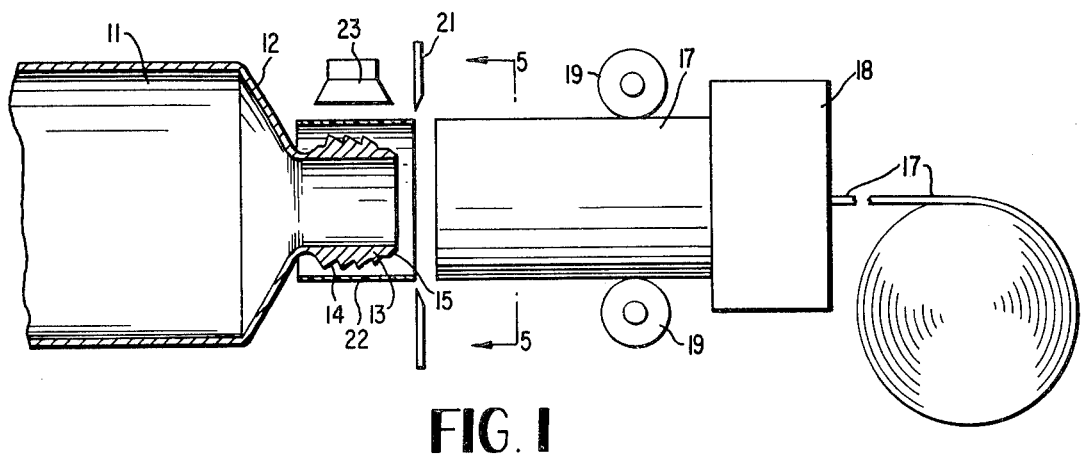
FIG. 1 is a partially diagrammatic partly sectional side view showing the method according to a preferred embodiment.

Referring to the drawings, a conventional empty toothpaste tube body 11 has a shouldered end 12 terminating in a rigid hollow dispensing neck 13. The tube is preferably an integral metal element, usually aluminum or an aluminum alloy. The neck is externally screw threaded at 14 in a conventional manner and the open end is surrounded by an axially outwardly facing lip 15. Since these threads are usually formed in a molding operation, the invention requires no departure from known methods of making such tubes. While neck 13 is shown as formed with a plurality of threads 14, the invention is applicable to a tube neck having only one or any number of threads for mounting the closure.

It is conventional, in the packaging of toothpaste for example, to form the complete empty tube and then attach a removable closure to the threaded neck, leaving the so-called bottom end open for filling and then crimping to complete the enclosure. It is also conventional practice to externally coat and print the empty tube and pass it through a drying oven before attaching the closure. When the tube emerges from the oven it is usually quite hot, and it is an important phase of the invention in the preferred embodiment to utilize this retained heat in attaching a plastic covering to the threaded neck of the tube before mounting the closure.

Figure 5:
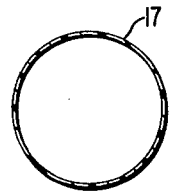
FIG. 5 is a section on line 5—5 of FIG. 1.

As shown diagrammatically in FIG. 1, a coil 16 of thin-walled hollow plastic tubing 17 in flat condition feeds into a device 18 wherein the tube is opened to the tubular hollow condition shown in FIG. 5. Tubing 17 is advanced as by intermittent feed rollers 19 until the leading end extends in surrounding relation over the threaded tube neck 13. At the time according to a preferred embodiment tube 11 is mounted on a conveyor (not shown) having just emerged from the drying oven so that the metal of the tube is hot.

Feed of tubing 17 stops after a predetermined length has been advanced, and then a knife or like severing unit indicated at 21 is actuated to cut off the leading end section of tubing 17. This severed section is shown in FIG. 1 as a separate collar 22 surrounding the neck threads. It will be noted that the axial length of severed collar 22 is such that its outer end extends outwardly beyond lip 15, for a purpose to appear.

Heat is applied to collar 22, and it immediately shrinks to a reduced diameter and length upon and around tube neck 13. Where the tube 11 is already heated, as in the preferred embodiment, the shrinking action may have started or even completed to some extent by the time knife 21 severs the collar. Where the tube 11 is unheated, a heating device such as the electrical hot air heater 23 may be disposed to cause shrinking of collar 22. Where tube 11 may have been heated but has cooled down somewhat, the heater 23 may be relied upon for auxiliary heat. In any event heat is provided at this point sufficient to shrink the particular material of the collar 22 upon the threaded tube neck.

Figure 2:
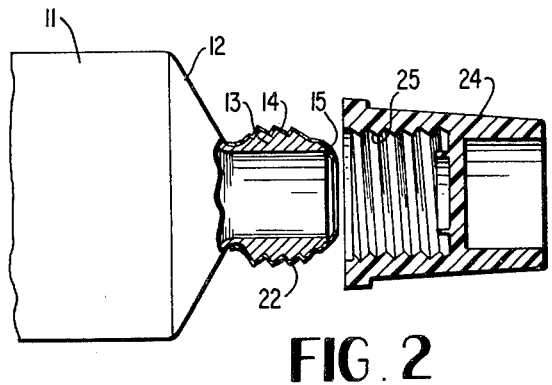
FIG. 2 is a fragmentary sectional side view illustrating the tube, insert and closure disposition and structure involved in a phase of the method.
Figure 3:
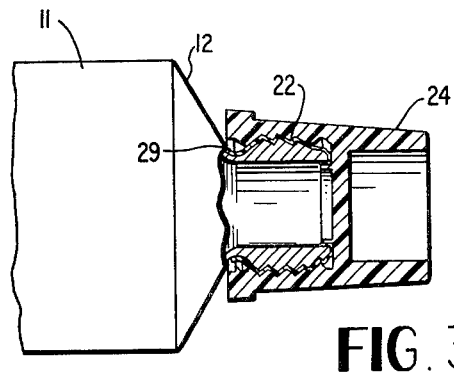
FIG. 3 is a fragmentary side view in section similar to FIG. 2 showing the closure in position after having completed conformation of the heat shrunk film to the threads.
Figure 4:
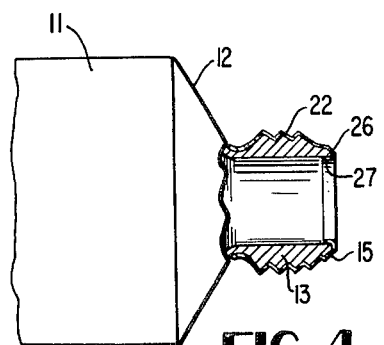
FIG. 4 is a fragmentary side view in section showing the covered neck thread section of the tube with the closure removed.

Now the usual rigid internally threaded molded plastic closure cap 24 is applied preferably while the collar 22, which has now mainly assumed the contour of the threads 14, remains relatively soft and warm. As shown in FIGS. 2 and 3, the internal threads 25 of closure 24 interfit with the covered threads 14 as the closure moves to final position on the tube neck 13, and the confined collar 22 is plastically deformed by the mechanical forces of the interacting threads 14 and 25 so that collar 22 is shaped to conform internally and externally to the threads. Also, see FIGS. 3 and 4, the outer annular portion 26 of collar 22 is deflected inwardly to closely overlie lip 15 and preferably a slight distance inwardly of the tube neck bore as shown at 27.

Once the closure is turned to tight position, the formed collar 22 cools in situ, providing a very tight substantially permanent coextensive covering upon the threaded tube neck. The process is continuous, the collar being installed and heat shrunk at one station (FIG. 1), and the closure applied when the tube is shifted by the conveyor to another station (FIG. 2). It is within the scope of the invention to provide and feed precut individual length collars 22 onto the tube neck at the first station, but the continuous length is preferred for production.

After the tube has been filled with toothpaste eventual users remove and reinstall the closure again and again without the abrasive toothpaste ever contacting the metal threads, so that a clean condition and appearance is retained.

It may be desirable to slightly undercut the tube neck or similarly form the inner end of the threads 14, as indicated at 29, so that a region of minimum external diameter is proved at that area wherein the collar 22 shrinks to close conformance, and this provides an effective axial anchor resisting axial displacement of the formed collar when the closure is applied or removed.

In actual practice, standard neck thread aluminum or like light metal tubes may be used, as well as standard thread molded plastic closure caps. Since the installed collar 22 as shrunk upon neck 13 is only a few mils in wall thickness, and since it is effectively resiliently deformable to conform to both threads 14 and 25, it provides an improved seal at the closure. Moreover, the plastic covering of threads 14 provides a smoother easier turning action for applying and removing the closure. The plastic of tubing 17 is preferably white for optimum appearance.

The tubing 17 may be any suitable heat shrinkable plastic. The preferable material is a polyvinylchloride film capable of providing collar sections of the requisite size slipping quickly over the threaded tube neck. Other examples of heat shrinkable film materials are polyester, polyethylene, polypropylene, polyvinylidene and pliofilm. Other heat shrinkable materials are disclosed in U.S. Pat. No. 2,452,607.

In a modification of the invention, suitable feeding means may be arranged to slide intermittently the open end of a coiled supply tube of said plastic material into its initial position upon said neck, and the means for severing the short sections of the installed tube just beyond the outer edge of the lip of said neck may be coordinated with suitable means which sweep a particular toothpaste tube so treated to another position wherein the cap-installing process may then take place. Meanwhile, the supply tube may be withdrawn slightly to permit another said toothpaste tube to be brought into the position just vacated by the first of said tubes, and so on in a substantially continuous process, as, for example, in a conventional capping machine.

I claim:

1. A method of providing a substantially permanent plastic covering upon a first member having an externally threaded metal portion for protection of the surface of the threads against abrasion comprising: disposing a thin-walled collar of heat shrinkable synthetic plastic material about said first member, said collar being axially located to surround said externally threaded portion of said first member and an anchoring recess in said first member heating said collar to soften said material and shrink it in axially fixed relation about and in substantial conformity with the surfaces of the threads of said threaded portion and said recess and, while said collar is warm and soft, relatively rotating said member in assembly with another member having internal threads to correspond with said external threads of said first member to permanently conform the said plastic material to the threaded contours of said members.

2. The method defined in claim 1, wherein said externally threaded member is the hollow dispensing neck of an empty tube and said internally threaded member is a closure mounted on said neck to prepare said tube for filling with a product to be dispensed.

3. The method defined in claim 1, wherein said externally threaded member is initially sufficiently hot to heat shrink said collar.

4. The method defined in claim 1, wherein all or part of said heat shrinking action is effected by heat directed from an adjacent heater unit.

5. The method defined in claim 2 wherein said collar initially has its outer end extending axially beyond the external neck so that said outer end is formed to extend inwardly over the outer end of said neck.

6. The method defined in claim 2, wherein said dispensing tube is composed of aluminum or aluminum alloy, said neck is an integral part of said tube, and said collar is polyvinyl cloride.

7. The method of protecting an external threaded region on the dispensing neck of an integral metal toothpaste or like tube against abrasion by the tube contents during the dispensing life of said tube comprising: positioning a thin-walled collar of heat shrinkable synthetic plastic material around said threaded neck while the tube is empty in the presence of heat sufficient to soften and shrink the material upon and in substantial conformity with the surfaces of said threads and in an anchoring recess in said neck, to fix said collar axially in position on said neck, and while said collar is warm and soft rotatably mounting the internally threaded closure member of said tube on said neck whereby said collar is more tightly secured on said neck and permanently conformed to matching threaded contours of said neck and the mounted closure member.

8. A method for covering the externally threaded metal neck of a dispensing container for protecting the threads against abrasion by contents from said container between dispensing operations comprising the steps of providing a container having an externally threaded metal neck portion and a thread covering element anchoring portion adjacent the axially inner end of said threaded portion, positioning said container at an element applying station, expanding to tubular condition and longitudinally advancing the leading end of a supply length of initially flat thin-walled tubing of said material toward the neck of the container positioned at said station, severing said tubing at said expanded end to provide a preformed tubular element of desired length separated from said tubing and positioned in surrounding relation to said externally threaded and anchor portions of said neck, and heat shrinking said element onto said threaded portion and said anchoring portion of said neck whereby it is axially fixed in permanent position on the surfaces of said threads and then rotatably applying the closure device for said container onto said covered neck threads.

9. The method defined in claim 8, wherein said tubing is advanced to surround said container neck before said element is severed therefrom.

10. The method defined in claim 8, wherein said container has an integral metal neck and adjacent shoulder portion and wherein the step of positioning said container at said station comprises conveying containers successively from a drying oven, where container bodies are heated to dry a surface coating, and locating said container at said station while sufficient heat is retained in the metal to at least partly heat shrink said element upon said neck.

11. The method defined in claim 8, wherein said strip is intermittently fed toward said station, and said tubular element severing step is effected during a dwell period of the intermittent feed.

12. The method defined in claim 8, wherein said container neck is conveyed to said station while retaining heat from a previous operation sufficient to at least participate in said heat shrinking operation.

13. The method defined in claim 8 wherein said anchoring portion is an annular recess near the said neck threads and the leading end of said tubular element is heat shrunk into said recess.

14. The method defined in claim 13 wherein said recess is a reduced diameter undercut region in said neck.

15. A method of producing a container having an externally threaded metal dispensing neck that is protectively covered against abrasion, comprising providing a container having a continuous recess around said metal neck longitudinally inwardly of the externally threaded region, positioning a preformed relatively thin-walled collar of heat shrinkable synthetic plastics material around said neck covering said recess and said threaded region in the presence of sufficient heat to soften and shrink said collar upon the neck about said threaded region and with at least an annular portion thereof contracted in snug conformance within said recess to axially anchor said collar, and while said collar is warm and soft rotatably applying a device, having internal threads corresponding to external threads on said neck, upon said covered neck causing said material to closely and permanently conform to threaded contours of the neck and said device.

16. The method defined in claim 15 wherein said device is the closure cap for the container.

17. A method of providing a substantially permanent protective covering upon an externally threaded region on the metal dispensing neck of a container comprising providing a container having a continuous recess around said metal neck longitudinally inwardly of said threaded region, positioning a relatively thin-walled collar of heat shrinkable synthetic plastics material around said threaded neck region in the presence of sufficient heat to shrink said collar upon the neck with at least an annular portion thereof contracted in snug conformance within said recess to axially anchor said heat shrunk collar on said neck, and then while said collar is warm and formable rotatably applying a closure device having internal threads corresponding to threads on said neck upon said covered neck to closely and permanently conform said collar to the threaded contours of said neck and closure device.

* * * * *

UNITED STATES PATENT AND TRADEMARK OFFICE
CERTIFICATE OF CORRECTION

PATENT NO. : 3,906,070
DATED : September 16, 1975
INVENTOR(S) : Dusan S. Lajovic It is certified that error appears in the above–identified patent and that said Letters Patent are hereby corrected as shown below:

Column 5, line 51, change "strip" to --tubing--.

Signed and Sealed this

*third* Day of *February 1976*

[SEAL]

*Attest:*

RUTH C. MASON
*Attesting Officer*

C. MARSHALL DANN
*Commissioner of Patents and Trademarks*